United States Patent [19]

Ohgoda et al.

[11] Patent Number: 4,719,356

[45] Date of Patent: Jan. 12, 1988

[54] ENDLESS CIRCULATING CONVEYING SYSTEM FOR RADIATION IMAGE RECORDING AND READ-OUT APPARATUS

[75] Inventors: Makoto Ohgoda; Tokukazu Saito, both of Kanagawa, Japan

[73] Assignee: Fuji Photo Film Co., Ltd., Kanagawa, Japan

[21] Appl. No.: 739,592

[22] Filed: May 31, 1985

[30] Foreign Application Priority Data

Jun. 1, 1984 [JP] Japan ................................. 59-112379

[51] Int. Cl.⁴ .............................................. G01T 1/105
[52] U.S. Cl. ................................. 250/484.1; 250/327.2
[58] Field of Search ........................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kotera et al. | 364/415 |
| 4,387,428 | 6/1983 | Ishida et al. | 364/414 |
| 4,400,619 | 8/1983 | Kotera et al. | 250/327.2 |
| 4,485,304 | 11/1984 | Teraoka et al. | 250/327.2 |
| 4,496,838 | 1/1985 | Umemoto et al. | 250/327.2 |
| 4,543,479 | 9/1985 | Kato | 250/327.2 |

FOREIGN PATENT DOCUMENTS

| | | |
|---|---|---|
| 0077678 | 4/1983 | European Pat. Off. . |
| 0079751 | 5/1983 | European Pat. Off. . |
| 0125800 | 11/1984 | European Pat. Off. . |
| 142709 | 5/1985 | European Pat. Off. ............ 378/172 |

*Primary Examiner*—Janice A. Howell
*Assistant Examiner*—Constantine Hannaher
*Attorney, Agent, or Firm*—Sughrue, Mion, Zinn, Macpeak, and Seas

[57] ABSTRACT

A radiation image recording and read-out apparatus comprises an image recording section for recording a radiation image of an object on a stimulable phosphor sheet, an image read-out section for scanning the stimulable phosphor sheet by stimulating rays and for detecting the light emitted thereby upon stimulation, and an erasing section for releasing the radiation energy remaining in the stimulable phosphor sheet. The stimulable phosphor sheets are circulated through these sections by conveyor belts and reused for image recording. Erasing conditions at the erasing section are adjusted so that the stimulable phosphor sheet is conveyed out of the erasing section at time intervals approximately equal to the image read-out time at the image read-out section.

4 Claims, 2 Drawing Figures

ENDLESS CIRCULATING CONVEYING SYSTEM FOR RADIATION IMAGE RECORDING AND READ-OUT APPARATUS

BACKGROUND OF THE INVENTION

1. Field of the Invention

This invention relates to a radiation image recording and read-out apparatus for exposing a stimulable phosphor sheet to a radiation passing through an object to have a radiation image of the object stored therein, exposing the stimulable phosphor sheet to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a number of stimulable phosphor sheets, and the number of stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets onto a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Patent Application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned along said circulation path for recording a radiation transmission image of an object on said stimulable phosphor sheet by exposing said stimulable phosphor sheet to a radiation passing through said object, (iii) an image read-out section positioned, along said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section along said circulation path for, prior to the next image recording on said stimulable phosphor sheet for which the image read-out has been conducted in said image read-out section, exposing said stimulable phosphor sheet to erasing light to release the radiation energy remaining in said stimulable phosphor sheet, whereby said stimulable phosphor sheet is circulated through said image recording section, said image read-out section and said erasing section and reused for radiation image recording.

The processing (i.e. erasing) for releasing the radiation energy remaining in the stimulable phosphor sheet at the erasing section is conducted by exposing the sheet to a predetermined amount of erasing light. The erasing light amount is given by the exposure time multiplied by the exposure light amount per unit time. Therefore, when fabricating the erasing section, it is necessary to select the erasing light amount, and the exposure time and the light amount per unit time which determine the erasing light amount.

However, the erasing conditions such as the erasing light amount, the exposure time and the exposure light amount per unit time affect the size of the erasing section as well as the fabrication cost and the image recording and read-out capacity of the apparatus, for example, the image recording interval in continuous image recording and read-out operations.

Particularly, since the built-in type radiation image recording and read-out apparatus is intended to be very convenient for mounting on a mobile X-ray diagnostic station, for example, it is desirable that the apparatus be able to conduct continuous image recording and read-out operations at as short intervals as possible, and be small.

Accordingly, the erasing conditions should be selected so that the efficiency of the whole apparatus is optimized.

SUMMARY OF THE INVENTION

The primary object of the present invention is to provide a built-in type radiation image recording and read-out apparatus wherein the erasing conditions at the erasing section are adjusted so that the efficiency of the whole apparatus becomes the highest.

Another object of the present invention is to provide a built-in type radiation image recording and read-out apparatus wherein the erasing conditions at the erasing section are adjusted to obtain the highest efficiency for the whole apparatus so that the erasing section does not become large and expensive when the time required for the erasing, i.e. the aforesaid exposure time (hereinafter referred to as the erasing time), is shortened for decreasing the image recording interval.

The built-in type radiation image recording and read-out apparatus in accordance with the present invention is characterized by adjusting the erasing conditions at the erasing section so that a stimulable phosphor sheet is conveyed out of the erasing section at time intervals approximately equal to the image read-out time at the image read-out section.

By "image read-out time at the image read-out section" is meant the time required for image read-out from one stimulable phosphor sheet, specifically the time required for reading-out a radiation image stored in one stimulable phosphor sheet by scanning the stimulable phosphor sheet by stimulating rays.

The "time intervals approximately equal to the image read-out time" embraces the case where the time intervals are exactly equal to the image read-out time and the case where the time intervals are different by several seconds from the image read-out time.

By "conveying of a stimulable phosphor sheet out of the erasing section" is meant that the stimulable phosphor sheet subjected to image erasing at the erasing section and readied for image recording is conveyed out of the erasing section.

The erasing conditions embrace various conditions defining the contents of the erasing, such as the erasing light amount, the exposure time and the exposure light amount per unit time.

In the apparatus of the present invention, since the erasing conditions at the erasing section are adjusted so that the stimulable phosphor sheet is conveyed out of the erasing section at time intervals approximately equal to the image read-out time at the image read-out section, it is possible to shorten the image recording interval while the size and the cost of the erasing section are decreased, and to improve the efficiency of the apparatus as a whole.

Specifically, since the stimulable phosphor sheets are circulated through the image recording step, the image read-out step and the erasing step, the image recording interval is ultimately governed by, and cannot be adjusted shorter than, the time of the step requiring the longest time. That is, when one stimulable phosphor sheet is circulated, the sum of the processing times at the respective steps and the conveyance times becomes the image recording interval. The image recording and read-out intervals can be halved when two stimulable phosphor sheets are circulated, and shortened to one third when three sheets are circulated. When three sheets are circulated, they can be allocated one each to the image recording, image read-out and erasing steps, and the step requiring the longest time among the steps is operated continuously. Therefore, when more than three stimulable phosphor sheets are circulated, the image recording interval cannot be decreased to less than the processing time of the step requiring the longest time among the steps.

However, the exposure time, i.e. the erasing time, required for exposing the stimulable phosphor sheet to a predetermined amount of erasing light is adjustable over a relatively wide range by changing the exposure light amount per unit time. Therefore, the time required for the erasing step may become the longest among the times required for the steps, depending on how the erasing conditions are adjusted. In this case, the image recording interval becomes long in proportion as the erasing time becomes long.

However, in the apparatus of the present invention, the erasing conditions are adjusted so that the erasing time is approximately equal to the image read-out time, i.e. at least so that the erasing time does not become longer than the image read-out time. Therefore, it is possible to prevent the image recording interval from increasing due to the erasing conditions. That is, by adjusting the erasing conditions as described above, it is possible to minimize the image recording and read-out intervals.

As described above, in the present invention, the erasing conditions are adjusted so that the erasing time is approximately equal to the image read-out time. This is the same as saying that the erasing conditions are adjusted so that a stimulable phosphor sheet is conveyed out of the erasing section at time intervals approximately equal to the image read-out time. Namely, the aforesaid erasing time is the erasing time in the case where only one stimulable phosphor sheet can be housed at the erasing section at a time and erasing of the next sheet is started after erasing of the current sheet is finished. Thus the erasing time coincides with the time intervals of conveyance of the erased sheet from the erasing section. When the case where a plurality of stimulable phosphor sheets are erased simultaneously at the erasing section is also embraced, it can be said that the image recording interval is governed by the time intervals of conveyance of one erased sheet out of the erasing section.

On the other hand, in order to erase the radiation energy remaining in the stimulable phosphor sheet, it is necessary to expose the sheet to a predetermined amount of erasing light. For this purpose, a very large light amount is necessary. Therefore, when the erasing time is shortened, it is necessary to use an erasing light source exhibiting a very large exposure light amount per unit time. At present, such erasing light sources are large and expensive, and present a problem with regard to cooling. Accordingly, from the viewpoint of the erasing section only, it is desirable that the erasing time be as long as possible. In the apparatus of the present invention, the erasing conditions are adjusted so that the time intervals of conveyance of the stimulable phosphor sheet out of the erasing section are approximately equal to the image read-out time and do not become longer than at least the image read-out time. Thus the erasing time is adjusted as long as possible within the limit of not increasing the image recording interval. Accordingly, it becomes possible to use an erasing light source which is as small and inexpensive as possible and to decrease the cost and the size of the erasing section.

Namely, in the apparatus of the present invention, it is possible to shorten the image recording interval of the apparatus as a whole, while the cost and the size of the erasing section are decreased.

DESCRIPTION OF THE PREFERRED EMBODIMENTS

The present invention will hereinbelow be described in further detail with reference to the accompanying drawings.

Figure 1:
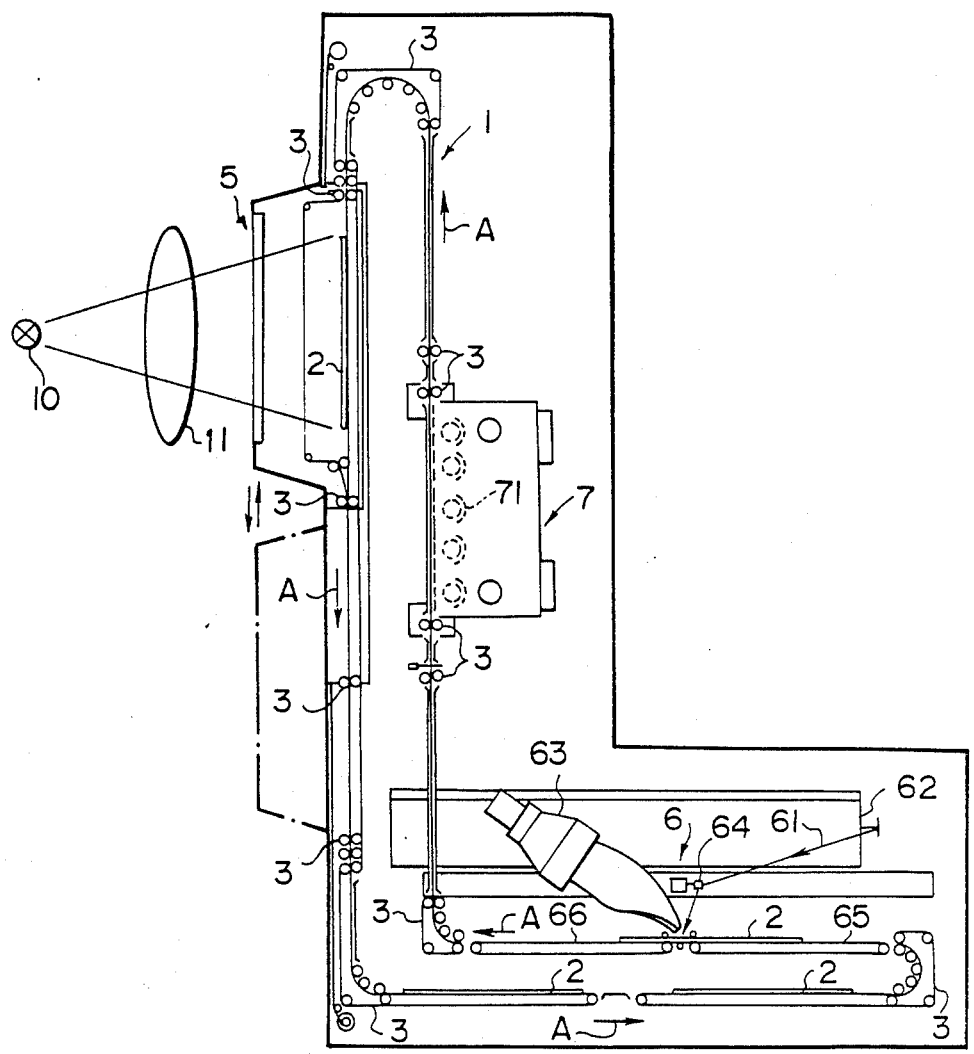
FIG. 1 is a schematic side view showing an embodiment of the radiation image recording and read-out apparatus in accordance with the present invention.

Referring to FIG. 1, the radiation image recording and read-out apparatus is provided with an L-shaped circulation path 1, and stimulable phosphor sheets 2 are conveyed and circulated by a circulation and conveyance means 3 comprising conveyor rollers, conveyor belts and the like defining the circulation path 1.

An image recording section 5, an image read-out section 6 and an erasing section 7 are positioned in this order in the sheet advancing direction as indicated by the arrow A along the circulation path 1.

At the image recording section 5, the stimulable phosphor sheet 2 is exposed to a radiation emitted by a radiation source 10 and passing through an object 11 to have a radiation image of the object 11 stored in the sheet 2. In this embodiment, the position of the image recording section 5 is adjustable vertically.

The exposed sheet 2 is conveyed by the circulation and conveyance means 3 in a counter clockwise direction as indicated by the arrows A along the circulation path 1 into the image read-out section 6.

The image read-out section 6 comprises a stimulating ray source 62 for emitting stimulating rays 61, e.g. a laser beam, for scanning the sheet 2, and a photoelectric read-out means 63, e.g. a photomultiplier, for detecting light emitted by the sheet 2 upon exposure to the stimulating rays 61 and converting it into an electric image signal. Reference numeral 64 denotes a galvanometer mirror. Since image read-out is conducted by moving the sheet 2 at a predetermined speed, the image read-out section 6 is provided with a space 65 for one sheet where the sheet 2 just prior to the image read-out is positioned and a space 66 for one sheet where the sheet 2 just after the image read-out is positioned.

After the read-out step, the sheet 2 is sent by the circulation and conveyance means 3 to the erasing section 7.

The erasing section 7 is provided with many erasing light sources 71 constituted by fluorescent lamps or the like. The sheet 2 is exposed to erasing light emitted by the erasing light sources 71 to release the radiation energy remaining in the sheet 2.

The erased sheet 2 is then sent by the circulation and conveyance means 3 to the image recording section 5.

The erasing section 7 houses one stimulable phosphor sheet 2 at a time and erases the radiation energy remaining in the sheet 2. After the sheet 2 is conveyed into the erasing section 7, it is stopped therein, exposed to erasing light for a time equal to the image read-out time, and then conveyed out of the erasing section 7. Thereafter, the next sheet 2 is conveyed into the erasing section 7, and erasing is conducted in the same manner. The erasing conditions such as the exposure light amount per unit time at the erasing section 7 are adjusted so that the time intervals of conveyance of the sheet 2 out of the erasing section 7 coincide with the image read-out time, i.e. so that erasing light in an amount sufficient for releasing the radiation energy remaining in the sheet 2 is irradiated to the sheet 2 in a time equal to the image read-out time.

Figure 2:
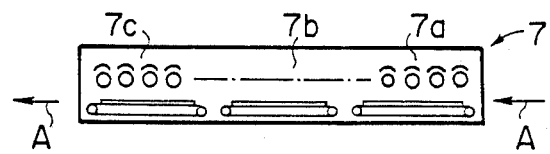
FIG. 2 is a schematic side view showing a modified form of the erasing section in the apparatus of the present invention.

FIG. 2 shows a modified form of the erasing section 7. In the erasing section 7, the three erasing zones each of which conducts erasing by maintaining one sheet 2 standing still as in the erasing section 7 of FIG. 1 are connected in series. The sheets 2 are sequentially conveyed in the direction as indicated by the arrow A from the image read-out section 6 to a first erasing zone 7a, from the first erasing zone 7a to a second erasing zone 7b, from the second erasing zone 7b to a third erasing zone 7c, and from the third erasing zone 7c to the image recording section 5. At each of the erasing zones 7a, 7b and 7c, the sheet 2 stands still and is exposed to erasing light for a time equal to the image read-out time. Therefore, erased sheets 2 are conveyed out of the erasing section 7 at the same time intervals as the image read-out time, and the exposure light amount per unit time is adjusted so that each sheet 2 is exposed to the necessary amount of erasing light before the sheet 2 carried into the erasing section 7 is conveyed out of the erasing section 7. In this case, since the time for which the sheet 2 is exposed to the erasing light is three times the exposure time in the embodiment of FIG. 1, the exposure light amount per unit time may be one third that in FIG. 1. Therefore, it is possible to use small and inexpensive erasing light sources.

When the image read-out time is adjusted to a different value, the time intervals of sheet conveyance out of the erasing section 7 should preferably be made approximately equal to the shortest image read-out time.

We claim:

1. In a radiation image recording and read-out apparatus including:
    (i) a circulating conveying means defining a predetermined circulation path for conveying stimulable phosphor sheets for recording a radiation image therein,
    (ii) an image recording section positioned along said circulation path for recording a radiation image of an object on each of said stimulable phosphor sheets by exposing said stimulable phosphor sheet to a radiation passing through said object,
    (iii) an image read-out section positioned along said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (iv) an erasing section positioned along said circulation path for, prior to the next image recording on said stimulable phosphor sheet for which the image read-out has been conducted at said image read-out section, exposing said stimulable phosphor sheet to erasing light to release the radiation energy remaining in said stimulable phosphor sheet, the improvement comprising means for adjusting the erasing conditions at said erasing section so that said stimulable phosphor sheets are conveyed out of said erasing section at time intervals approximately equal to the image read-out time at said image read-out section.

2. An apparatus as claimed in claim 1 wherein said erasing section comprises a plurality of erasing zones connected in series with each other for conducting erasing sequentially for each said stimulable phosphor sheet for a time at each erasing zone which is approximately equal to said image read-out time.

3. An apparatus as claimed in claim 1 or 2 wherein said circulation path is L-shaped.

4. An apparatus as claimed in claim 1 or 2 wherein said circulating conveying means comprises endless conveyor belts.

* * * * *